US006256735B1

(12) United States Patent
Maria

(10) Patent No.: US 6,256,735 B1
(45) Date of Patent: Jul. 3, 2001

(54) METHOD AND APPARATUS FOR LIMITING ACCESS TO NETWORK ELEMENTS

(75) Inventor: Arturo Maria, Bellevue, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/135,086

(22) Filed: Aug. 17, 1998

(51) Int. Cl.[7] .................................................. G06F 1/24
(52) U.S. Cl. .......................... 713/169; 713/170; 713/182
(58) Field of Search .................................... 713/169, 170, 713/171, 181, 182

(56) References Cited

PUBLICATIONS

Menezes, "Handbook of Applied Cryptography", 1996, sec.'s 12.3.1, 12.20, 9.77.*

* cited by examiner

Primary Examiner—Thomas R. Peeso

(57) ABSTRACT

A method and apparatus limit access to network elements. A network authentication key server generates a current key and transmits it to a plurality of network authentication nodes, each node being associated with one or more network elements. The server receives user requests for access to a given network element and determines whether the user is authorized to access the requested element. If access is granted, the request is modified to include the most current key. The request as modified is forwarded toward the requested network element. The modified request can be intercepted by the associated network authentication node and the request can be either passed through to the network element or discarded, depending on whether the request includes information that matches a current key maintained within the network authentication node.

13 Claims, 3 Drawing Sheets

METHOD AND APPARATUS FOR LIMITING ACCESS TO NETWORK ELEMENTS

BACKGROUND OF THE INVENTION

The present invention is directed to a method and apparatus for limiting access to network elements. More particularly, the present invention is directed to a method and apparatus for limiting access to network elements having disparate operating systems to only those users being authorized to access the respective elements.

Various communication network configurations are known in the art. Typically such communication network configurations include a plurality of different network elements. The network elements can be supplied by various vendors and therefore implement different types of interfaces. Similarly, the different types of network elements, which may be intelligent devices that include some processing capabilities, operate with different operating systems, for example different versions of Unix or DOS or Windows.

One example of an arrangement of network elements is illustrated in FIG. 1. In this particular arrangement a user may have access to various network elements via personal computer (PC) 101. The PC may be coupled to a router 102 via a wide area network (WAN) or local area network (LAN) connection. It would be possible to use TCP/IP transport protocols for initiating communications from the PC. The router can be coupled to different network elements such as a signal control point (SCP) 103, a signal transfer point (STP) 104 and a terminal server 105 which constitutes an additional intelligent device that interfaces to yet additional network elements. Examples of such additional network elements include a voice mail server (VMS) 107, a switch 108 which could be a Lucent Technologies 5ESS switch, and a Signal Access Cross Connect System (DACS) 109. It should be understood that this is merely an example of an arrangement of network elements and is not the sole representation of a configuration in which problems arise that can be addressed by the present invention.

In such network configurations employing a plurality of different network elements, it is difficult to provide a unified solution for limiting access by the user to each and every one of a plurality of the network elements. The problem arises because the different network elements operate with different operating systems and, as indicated before may be supplied by different vendors with different communication specifications. Therefore, typically each individual network element would have to operate some sort of authentication process to determine whether an individual user has access to that particular element. This requires different implementations of authentication processes depending upon the design of the respective network elements.

Another network where this problem arises is in a wireless cellular network where access is needed to a variety of network elements. Again, since the various network elements may have different operating systems with different degrees of authentication capability, it can be difficult to implement a universal solution that will force authentications.

It would be beneficial to have an arrangement by which access could be limited to the disparate network elements using a unified solution that is independent of the operating systems of the respective elements.

SUMMARY OF THE INVENTION

In accordance with an embodiment of the present invention, access to network elements is limited such that one authentication arrangement can service a plurality of network elements. In one specific embodiment, a network authentication key server generates a key of a predetermined length and transmits it to various network authentication nodes, each node being associated with at least one network element. When a user requests access to a given network element, the network authentication key server can detect whether the user is authorized to access the requested network element. If the user is permitted to access the element, then the server can modify the user's request to include the most current network authentication key. The modified request is then forwarded to the network element in question. A network authentication node associated with the requested network element intercepts the modified request and examines it. If the network authentication node determines that the modified request reflects the most current key that the node has received from the key server, then access to the network element is granted. If the authentication node determines that the request does not reflect the appropriate authentication key, then access will be denied. The network authentication nodes can therefore act as gates to the network elements which may be traversed only after a user has been authenticated by the network authentication key server.

In accordance with this arrangement, the network authentication node can operate in a mode that is transparent to both the user and to the network elements. In one embodiment of the invention, the network authentication key server includes a database which is examined to determine which network elements, if any, a given user is permitted to access.

Further advantages and details regarding the present invention will be described below.

DETAILED DESCRIPTION

Figure 1:
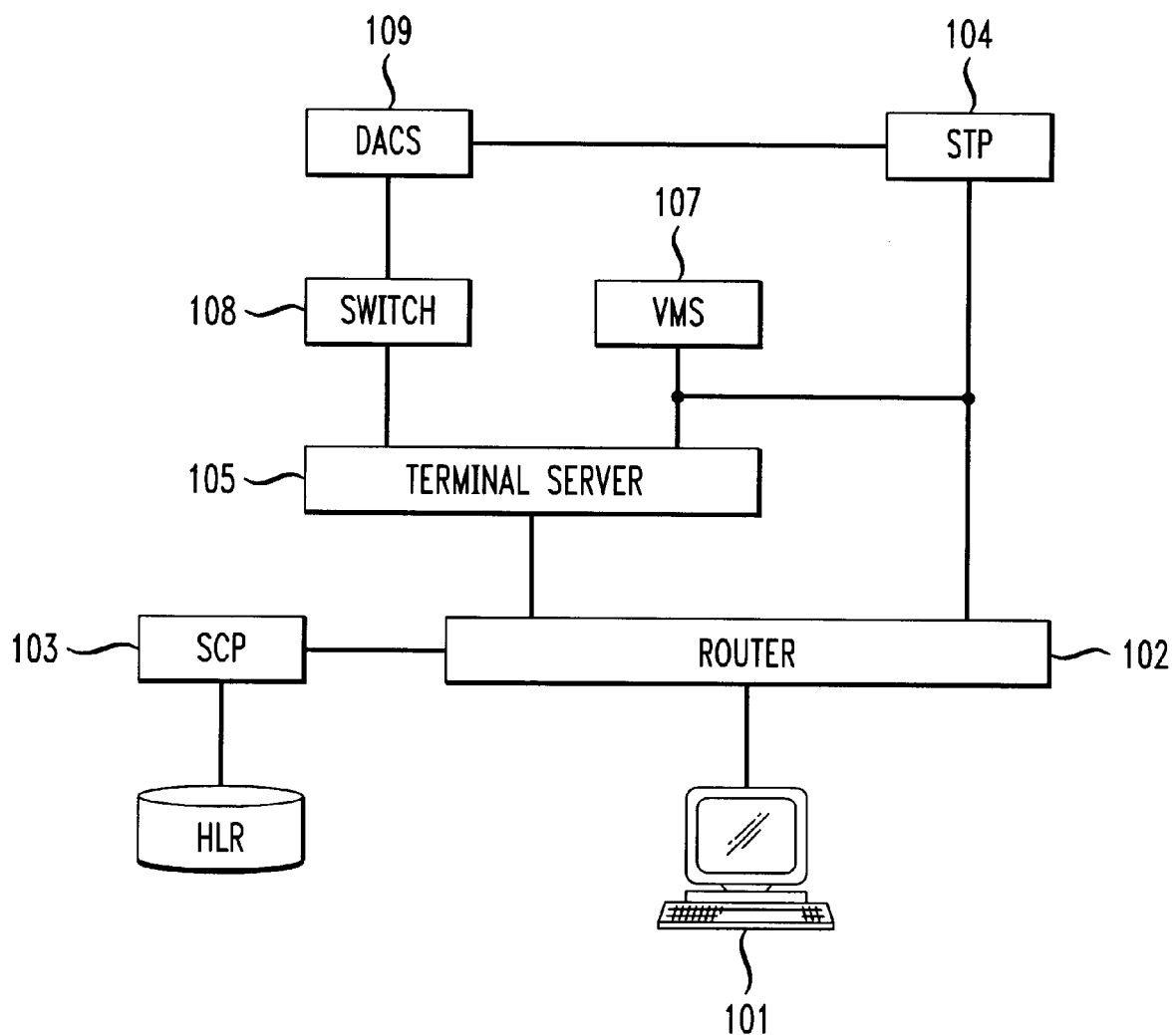
FIG. 1 illustrates an example of a communication network arrangement which is known.
Figure 2:
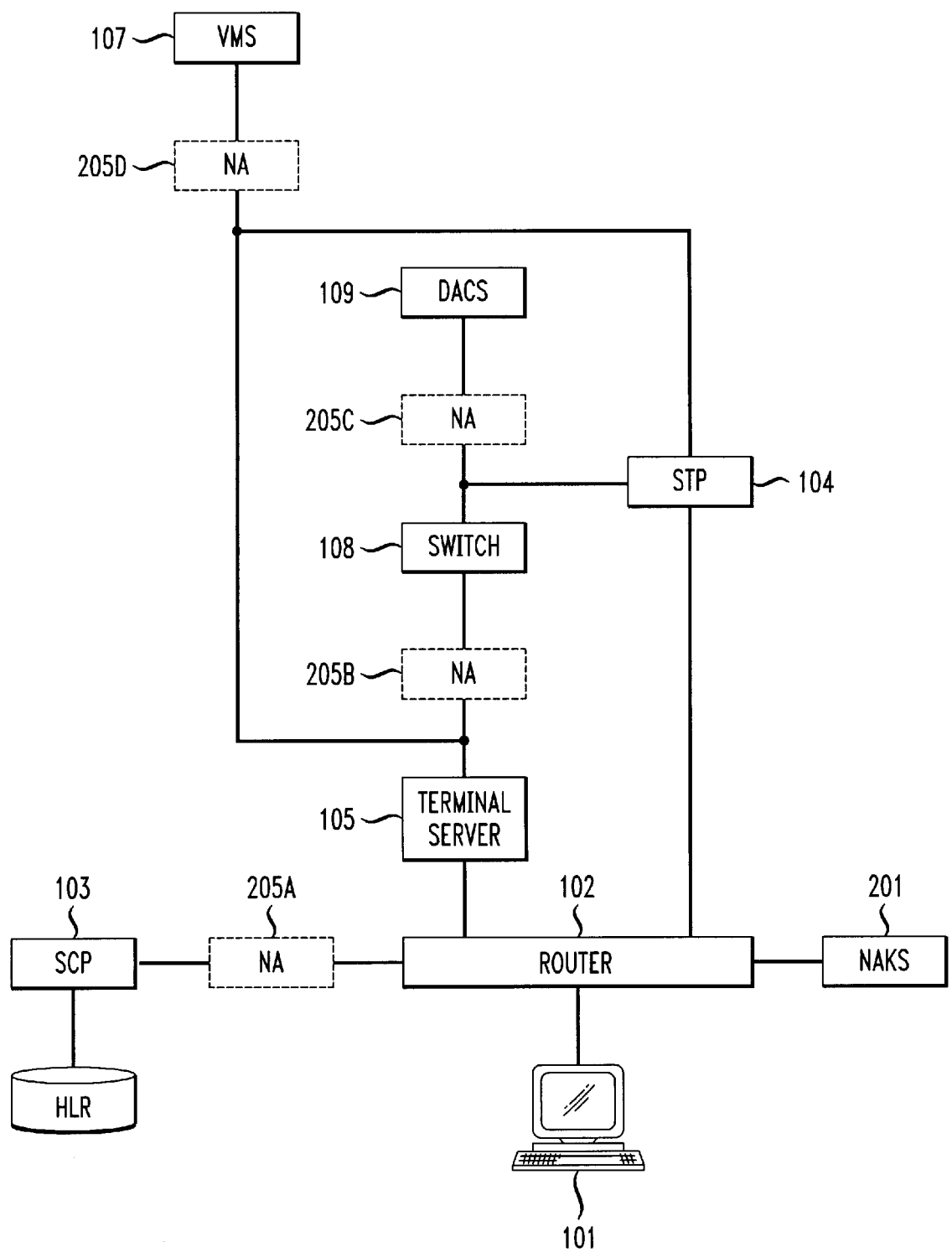
FIG. 2 illustrates an example of a communication network such as that shown in FIG. 1, modified to include an embodiment of the present invention.

In accordance with the present invention, authentication techniques are provided in a communication network so as to limit user access to individual network elements which may have disparate operating systems or may be supplied by different vendors. An example of a system employing an embodiment of the present invention is illustrated in FIG. 2. In regard to its network elements, FIG. 2 is very similar to FIG. 1. In fact, like elements in the two figures bear like reference numerals. The new elements in FIG. 2—namely the authentication key server 201 and the network authenticator nodes (NA) 205A, 205B, 205C and 205D—are the elements that provide the access limitation sought in the present invention. (These elements are also referred to herein as "authenticating" and "authenticator" key servers or nodes.) More specifically, the network authenticating key server (NAKS) 201 generates a key. This key can be a multi-bit key, for example 128 bits. In addition, the key can be periodically generated so that a new key is produced at specified time intervals. These are examples of techniques for providing an authentication key and other techniques may be employed. What is significant is that there is some authentication code generated by a server and transmitted to various network authentication nodes for subsequent use by those nodes in deciding whether to allow or deny access to an associated network element.

Figure 4:
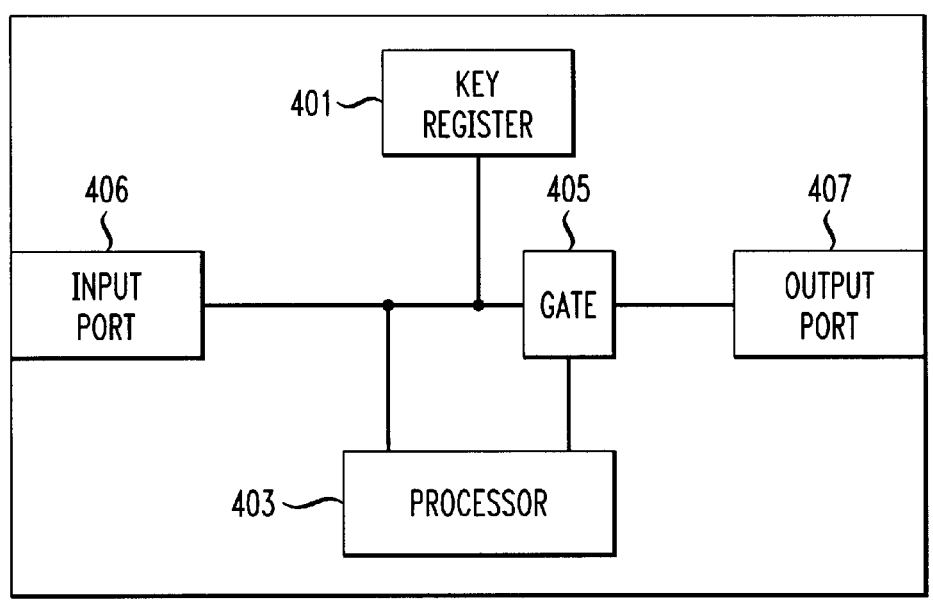
FIG. 4 is a block diagram that illustrates one example of an embodiment of a network authentication node illustrated in FIG. 2.

In regard to the network authentication nodes, it is shown in the figure that each network authentication node is associated with a network element. For example, network authentication node 205A is associated with network element SCP 103. Similarly, network authenticating node 205B is associated with a switch 108. These network authenticator nodes are shown in dashed lines to represent that they are substantially transparent to the rest of the network and to the user. In operation, the network authenticating nodes receive a current key generated by the network authenticating key server. This key is then held by the authenticating node. In a sample embodiment of such a node as shown in FIG. 4, the key can be maintained in a key register, 401. The key could be maintained alternatively in some other device capable of storing the key for at least as long as it takes for a new key to be generated. The network authenticating node may also include a processor 403 and a gate 405 interposed between ports 406 and 407. Operation of the network authenticator node will be described with reference to these elements; however it should be noted that alternative configurations can be provided for the network authenticator which will also provide the functionality of storing a key and then comparing the stored key against a user key.

Figure 3:
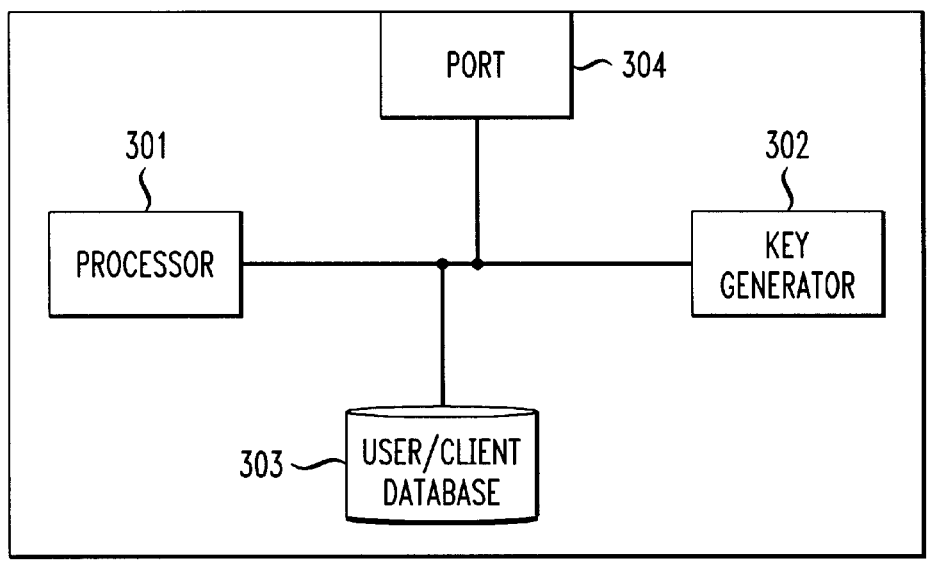
FIG. 3 provides a block diagram of one example of an embodiment of a network authentication key server of FIG. 2.

An example of the network authenticating key server is illustrated in FIG. 3. In this example the server includes a processor 301, a key generator 302, a subscriber database 303 and a port 304. All of the elements are connected to one another via some sort of internal bus architecture. The key generator could be a pseudo-random number generator or any type of key generator known in the art. The processor can assure that keys are periodically transmitted from the key server to the various network authenticating nodes as required by the implementation selected. The subscriber database can be used by the processor so as to determine access privileges of a given user as will be described below.

In operation, once the server has transmitted a key to the various network authentication nodes, it awaits receipt of a user's access request with regard to a given network element. For example, suppose that the user of device 101 seeks access to the voice mail server, VMS 107. The user's request is detected by the network authenticating key server. The authenticating key server either asks for or simply receives information identifying the user. Such information could be constituted by some sort of user id/user password combination. Alternatively, user identification information could be constituted by such things as a calling party telephone number identified by ANI (Automatic Numbering Information). The specific identification information is not critical. What is important is that the server be able to identify the user with reasonable accuracy. Once the user is identified, the server can then examine the subscriber database and determine whether the identified user is authorized to access the network element to which the user's request is directed. If the network authenticating key server detects that the user does not have authorization to access the network element, then the request can be discarded or dropped. If, however, the network authenticating key server determines that the user is authorized to access the network element, then the server can modify the request so as to somehow reflect the current key information which has already been passed on to the various network authenticating nodes.

In one embodiment of the present invention, the request can be modified to incorporate the actual generated key in either a header or a trailer of the request. Then, when a network authenticating node associated with the requested network element intercepts the request, it can easily strip away the appended key and determine whether that key matches the current key maintained by the network authenticating node. If the keys match, then the node can pass the request through to the network element. In the embodiment of FIG. 4, this would mean that the processor 403, upon detecting that a received request contains a key corresponding to that which is stored in the key register 401, can control the gate 405 to allow the network request to be passed from an input port 406 to an output port 407 and thus on to the network element. The network authenticator is transparent to the user. If the authenticating node does not detect the current key in the user's request, then the request can be dropped by the node and thus never passed through to the requested network element.

Not only is the authenticating node transparent to the user, but the key itself is transparent to the user. The user never receives a copy of the key which is used to allow access to a network element. Instead, the user at best maintains the identification information necessary to represent who the user is and then the network authenticating key server and network authenticating node operate together so as to control access to the requested network element.

In one embodiment of the present invention, the solution of providing this authorization process is hardware-based and operates between a physical and datalink layer of the OSI model. The server can be a general purpose UNIX computer that holds a repository of user identifiers and passwords, along with profiles that specify the network elements which various end users are allowed to access. The authenticator node can be a "black box" that has its own specialized operating system compatible with the server. The node can communicate directly with the server. In addition, in one of the embodiments the key is inserted into the header of the TCP/IP message which constitutes the request for the network element. The key can be changed periodically so that it is possible that a given user will attempt to access the same network element at different times and the server will use different keys at those different times for purposes of permitting access to the network element. In such a circumstance, the user is not ever aware that different keys have been used to authorize the access.

The present invention thus provides flexibility for controlling access to network elements that may be supplied by different vendors and/or may have different operating systems which make providing a unified solution to access control difficult. The solution proposed by the present invention provides equipment that is essentially transparent to the user and avoids placing the access control keys in the hands or control of the user during the authorization process.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method for authenticating access to a network element, the method comprising the steps of:

transmitting a current key to a plurality of network authenticator nodes, each node corresponding to at least one network element;

receiving a request to access a network element from a requester;

detecting whether the requester is authorized for the requested access;

appending said current key to a request from an authorized requester;

transmitting the request and appended current key to the network element; and passing the request to the network element when said appended current key corresponds to a current key received by the network authentication node associated with the requested network element.

2. The method of claim 1 wherein said step of detecting comprises the substeps of:

receiving a requester identifier and a requester password; and examining a memory to determine whether the requested network element is accessible by the requester identifier/password combination received.

3. The method of claim 1 wherein said step of appending comprises the step of inserting the key in a TCP/IP header for the request.

4. The method of claim 1 comprising the further steps of periodically modifying the current key and forwarding the modified current key to the network element authentication nodes.

5. A method for providing limited access to a plurality of network elements wherein at least two of the network elements have different operating systems, the method comprising:

periodically generating an access key wherein a most recently generated key constitutes a current key;

transmitting the current key to a plurality of network authentication elements, each element corresponding to one of the network elements;

processing a request from a user for access to one of the network elements, said step of processing including the substeps of, detecting whether the user is authorized to access the requested network element, modifying the request if the step of detecting determines that the user is authorized to access the requested network element, and forwarding the modified request toward the requested network element;

intercepting the modified request at the network authentication element corresponding to the requested network element; and passing the access request corresponding to the modified request if the modified request reflects the current key received by the network authentication element.

6. The method of claim 5 wherein said substep of detecting comprises the substeps of:

receiving a requester identifier and a requester password; and examining a memory to determine whether the requested network element is accessible by the requester identifier/password combination received.

7. The method of claim 6 wherein said substep of modifying comprises the substep of inserting the current key in a TCP/IP header for the request.

8. A method for providing limited access to a plurality of communication network elements, the method comprising the steps of:

generating a first key;

transmitting the first key to a plurality of network authentication nodes, each node associated with at least one network element;

receiving a first request from a first user to access a first network element;

detecting that said first user is authorized to access said first network element;

modifying said first request to incorporate the first key;

intercepting the modified first request at a network authentication node that corresponds to said first network element; and allowing the first user to access the first network element.

9. The method of claim 8 comprising the further steps of:

after generating the first key generating a second key;

transmitting the second key to the plurality of network authentication nodes;

receiving a second request from said first user to access said first network element;

detecting that said first user is authorized to access said first network element;

modifying the second request to incorporate the second key;

intercepting the modified second request at the network authentication node that corresponds to said first network element; and allowing the first user to access the first network element.

10. The method of claim 8 comprising the further steps of:

receiving a request from a second user to access said first network element;

detecting that said second user is not authorized to access said first network element; and discarding the request from the second user.

11. The method of claim 8 comprising the further steps of:

receiving a request from a second user to access a second network element;

detecting that said second user is authorized to access said second network element;

modifying said second request to incorporate the first key;

intercepting the modified second request at a network authentication node associated with said second network element; and allowing the second user to access the second network element.

12. A system for providing limited access to a plurality of network elements operating on different operating systems, the system comprising:

a network authentication server including,
 a database that contains access rules related to the plurality of network elements, and
 a key generator; and a plurality of authentication nodes, each coupled to said network authentication server and associated with at least one of said plurality of network elements, each authentication node including a current key store.

13. The system of claim 12 wherein said network authentication server comprises a timer coupled to said key generator.

* * * * *